United States Patent [19]

Hehn

[11] Patent Number: 4,928,825
[45] Date of Patent: May 29, 1990

[54] CASSETTE STORAGE CONTAINER

[75] Inventor: Bruce A. Hehn, Massillon, Ohio

[73] Assignee: Alpha Enterprises, Inc., Canton, Ohio

[21] Appl. No.: 359,104

[22] Filed: May 31, 1989

[51] Int. Cl.⁵ .......................................... B65D 85/67
[52] U.S. Cl. .................................. 206/387; 206/493; 206/307
[58] Field of Search ............... 206/387, 1.5, 493, 444, 206/307

[56] References Cited

U.S. PATENT DOCUMENTS

| | | | |
|---|---|---|---|
| 3,587,841 | 6/1971 | Devejian | 206/52 |
| 3,896,929 | 7/1975 | Mills | 206/387 |
| 4,011,940 | 3/1977 | Neal et al. | 206/1.5 |
| 4,056,244 | 11/1977 | Matsutsuka | 242/197 |
| 4,078,657 | 3/1978 | Schurman | 206/387 |
| 4,184,594 | 1/1980 | Hehn | 206/387 |
| 4,196,806 | 4/1980 | Posso | 206/387 |
| 4,230,225 | 10/1980 | Okada et al. | 206/387 |
| 4,231,474 | 11/1980 | Takahashi | 206/387 |
| 4,235,334 | 11/1980 | Ahn | 206/387 |
| 4,291,801 | 9/1981 | Basili et al. | 206/493 |
| 4,347,933 | 9/1982 | Ishida et al. | 206/387 |
| 4,428,482 | 1/1984 | Ogawa | 206/387 |
| 4,492,417 | 1/1985 | Saito et al. | 312/9 |
| 4,593,814 | 6/1986 | Hagiwara et al. | 206/387 |
| 4,614,269 | 9/1986 | Dietze et al. | 206/387 |
| 4,753,347 | 6/1988 | Bellante et al. | 206/387 |

Primary Examiner—Paul T. Sewell
Assistant Examiner—Jacob K. Ackun, Jr.
Attorney, Agent, or Firm—Michael Sand Co.

[57] ABSTRACT

A container for storing a tape cassette of the type having a pair of spaced tape reel hubs. Each hub has a cylindrical sidewall which defines a recess in the hub. The storage container includes enclosure means for receiving and enclosing a cassette in the container. Diametrically opposed pairs of fingers are molded integrally with a bottom wall of the container and project into the hub recesses through an aligned access opening formed in a bottom wall of the tape cassette upon placing the cassette into the container. The fingers are formed with a concave inner edge, and a convex outer edge having an elongated straight portion and an undercut formed thereon adjacent to the container bottom wall. The convex outer edge of the fingers are engaged by the hub sidewall, whereby the combination of the undercut and curved inner edge enables the fingers to flex inwardly upon initial placement of a cassette into the storage container. The fingers urge toward a normal biased position and the elongated straight portion moves into engagement with the hub sidewall upon full insertion of the cassette into the storage container to form an axially extending frictional line contact therebetween, for preventing rotation of the hubs and resultant unwinding of and possible damage to the tape contained thereon. An angular relationship between the undercut and the concave inner edge provides for integral one-piece molding of the container in a relatively simple mold. Spaced annular members limit lateral movement of the cassette within the container.

14 Claims, 3 Drawing Sheets

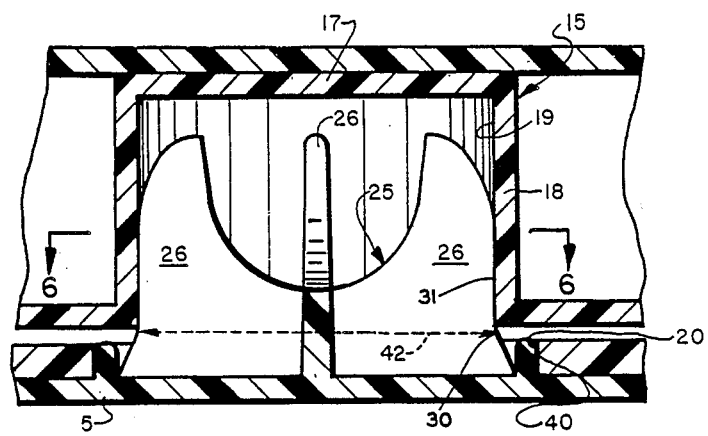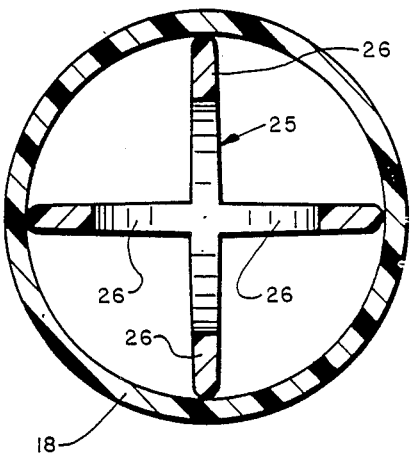
FIG. 3  FIG. 6
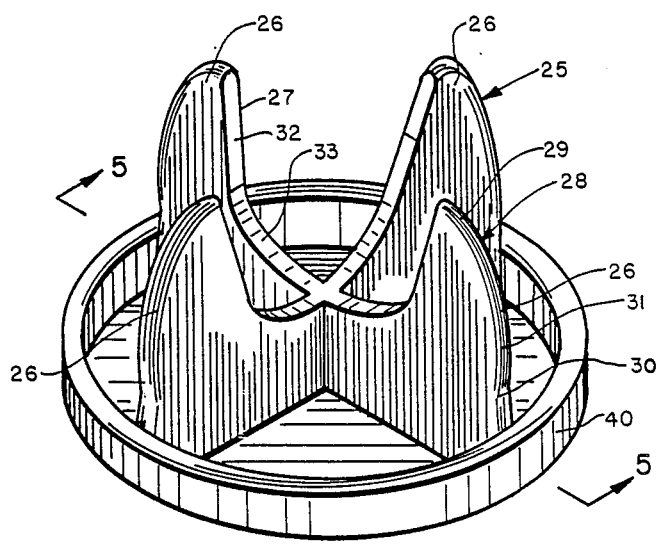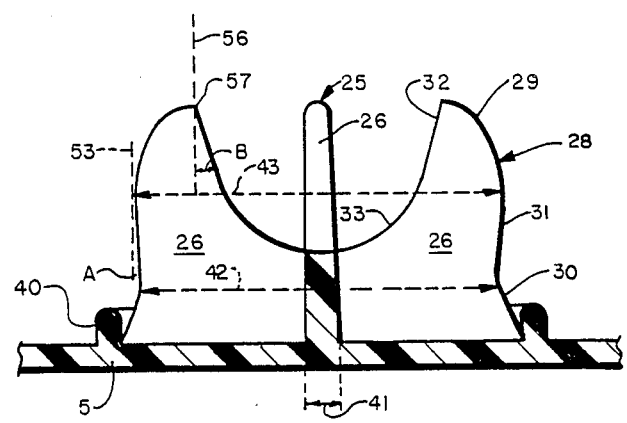
FIG. 4  FIG. 5

CASSETTE STORAGE CONTAINER

BACKGROUND OF THE INVENTION

1. Technical Field

The invention relates to containers, and in particular to containers for storing video cassettes. More particularly, the invention relates to a storage container which is adapted to receive and enclose a video cassette and which prevents rotation of the tape reel hubs housed within the cassette.

2. Background Information

The use of video cassettes together with associated equipment such as video cassette recorders continues to grow in popularity. One type of cassette is used primarily by individuals to record programs directly from a television or for videotaping of live events for replay at a later time, or alternatively, is rented or purchased with a program already prerecorded thereon. Another type of video cassette is used primarily for commercial purposes, and houses a magnetic tape having a three-quarter inch width format, which is significantly wider than the half-inch tape format present in cassettes of the type used by individuals.

It is desirable that these cassettes be shipped and stored in protective boxes or containers to prevent physical damage to the cassette during shipment, as well as to keep the cassette relatively dust-free during storage. It also is desirable that the tape reel hubs of these cassettes, and especially those of the larger tape format, be prevented from rotating during shipment caused by vibrations resulting from transport. Such rotation can cause the tape in the cassette to unwind from the hubs, often resulting in damage to the unwound portion of tape and loss of the information stored thereon.

Many of the cassette storage containers disclosed in the known prior art utilize one or more buttons or pins which engage drive holes formed in the tape reel hubs to prevent the hubs from rotating, as shown in U.S. Pat. Nos. 3,876,071; 4,011,940; 4,054,206; 4,078,657; and 4,231,474. Although such storage containers limit the rotation of the cassette hubs, some rotation usually is necessary for moving the drive holes into alignment with the retention pins. Thus, damage to the small portion of the tape which unwinds from such rotation still can occur. U.S. Pat. No. 4,245,740 shows another cassette storage container in which a pin engages one of the drive holes in each of the tape reel hubs directly and immediately upon insertion of the cassette into the container.

U.S. Pat. No. 4,428,482 shows another prior art storage container having vertical fins attached to a projection which fit into grooves of the hub recess of a cassette. However, the container shown in this prior art patent is not intended to prevent rotation of cassette tape reel hubs which lack teeth or grooves.

The closest known prior art to applicant's invention is shown in U.S. Pat. Nos. 3,896,929; 4,056,244; 4,593,814; and in pending U.S. patent application Ser. No. 07/220,682 filed July 18, 1988. However, the device shown and described in U.S. Pat. No. 3,896,929 is intended for use with audio cassettes wherein the studs of the device frictionally engage the teeth of the hub to prevent rotation of the hub. The device disclosed in U.S. Pat. No. 4,056,244 also is intended for use with audio cassettes and engages slots formed between adjacent teeth of the hub to prevent rotation of the hub. The storage case disclosed in U.S. Pat. No. 4,593,814 includes a discontinuous ring which contacts the wall of a video tape cassette reel hub to prevent rotation thereof.

In order to be competitive in the video cassette container field, it is necessary to mass produce the containers at as low a cost as possible. These containers usually are injection molded of plastic, and preferably in one piece with the tape reel retention device being integrally molded with the container in a single procedure and at the same time to reduce costs. Use of a relatively simple mold is preferred in molding such containers, that is, a mold not having any or as few as possible moving parts to reduce molding time as well as the cost of manufacture and maintenance of the molds. Many of the prior art containers containing hub retention devices require a complicated mold containing moving parts, all of which increases the cost of manufacture of the container.

It is also desirable that the frictional retaining contact of the hub retention devices with the reel hub cover a relatively large area in order to increase the frictional holding capacity thereof, as well as to prevent marring of the reel hub as could occur with point contact retention devices, which could affect its operation after removal from the container and placement in the video playback and/or recorder device.

There is no storage container for video cassettes of which I am aware, other than my invention set forth below, which prevents rotation and rattling of the tape reel hubs of a cassette by utilizing opposed pairs of flexible fingers which establish a frictional line contact with the hubs and which can be molded in a simple injection mold relatively free of moving parts.

SUMMARY OF THE INVENTION

Objectives of the present invention include providing an improved cassette storage container which prevents rotation of the tape reel hubs of a cassette when the cassette is placed in the container for storage, so that unwinding of and possible damage to the tape contained within the cassette is avoided. Another objective of the present invention is to provide such an improved storage container which prevents rattling and other movement of the tape reel hubs in the cassette.

A further objective of the present invention is to provide such an improved storage container which properly positions the cassette in the container and prevents lateral movement of the cassette therein, and which prevents rotation of the reel hubs immediately upon engagement with the hubs without requiring limited rotation of the hubs to provide alignment between pins and drive holes as in some prior art devices.

Still another objective of the present invention is to provide such an improved storage container which securely grasps the cassette to prevent it from tumbling out of the storage container upon opening thereof, even if opened incorrectly.

A still further objective of the invention is to provide such an improved cassette storage container which can be mass-produced relatively inexpensively by plastic molding procedures utilizing a relatively simple mold which is free of moving parts and which produces an integrally formed one-piece storage container in which the hub retention members are integral with and molded concurrently with in a single molding procedure, the remainder of the container, thus eliminating the need for assembly of the storage container and/or hub retention members subsequent to the molding procedure.

Another objective of the present invention is to provide both a shipping and storage container for cassettes which prevents physical damage to the cassettes during shipment, and provides storage in a relatively dust-free container.

A further objective of the invention is to provide such a storage container in which the prevention of hub rotation is accomplished by a frictional, generally elongated line contact with the hub wall of the tape reel rather than a point contact as in prior hub retention devices, and which is relatively unaffected by small variations in the diameter of the hub.

These objectives and advantages are obtained by the improved cassette storage container of the invention, the general purpose of which is to store a tape cassette of the type having at least one tape reel hub comprising a cylindrical sidewall defining a recess in the hub, the hub recess being accessible through an opening formed in a bottom wall of the cassette, the storage container including enclosure means for receiving and enclosing a tape cassette in the storage container; and hub engaging means formed on the storage container and located for entering the hub recess through the access opening when a cassette is placed in the container for preventing rotation of the tape reel hub, the hub engaging means including at least a pair of flexible, generally opposed fingers movable between normally biased and flexed positions, the fingers being engaged by the sidewall of the hub and moved to the flexed position upon placing a cassette into the storage container, so that the fingers urge toward the normal biased position and into frictional line contact with the cylindrical sidewall to prevent rotation of the tape reel hub within the cassette.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

FIG. 3 is an enlarged fragmentary sectional view similar to FIG. 2, showing the self-locking finger assembly fully engaged with the tape reel hub of the video cassette;

FIG. 4 is an enlarged perspective view of the self-locking finger assembly removed from the cassette container;

FIG. 5 is a sectional view taken on line 5—5, FIG. 4;

FIG. 6 is a sectional view taken on line 6—6, FIG. 3;

Similar numerals refer to similar parts throughout the drawings.

DESCRIPTION OF THE PREFERRED EMBODIMENT

Figure 1:
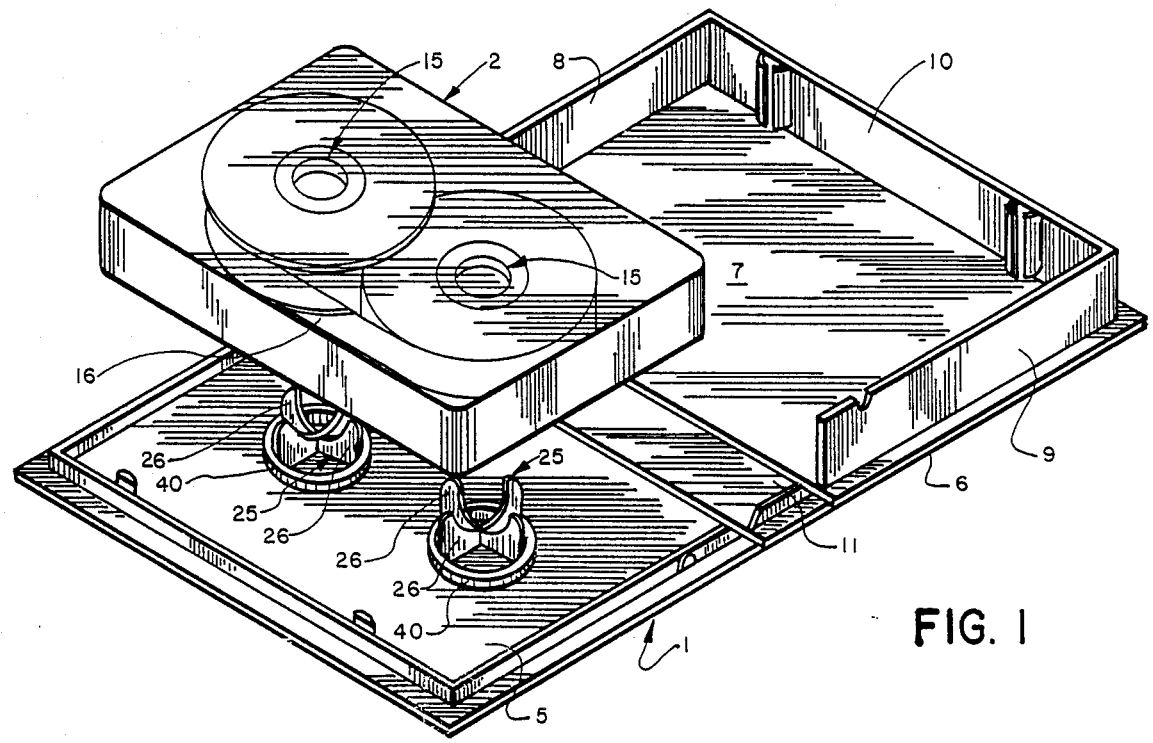
FIG. 1 is a perspective view showing the improved self-locking finger assembly of the present invention incorporated into a video cassette storage container, with a video cassette being shown just prior to placement in the container.

The improved cassette storage container of the present invention is indicated generally at 1, and is shown in FIG. 1 in an open position prior to receiving and enclosing therein a video cassette, indicated generally at 2. Storage container 1 has a rectangular box-shaped configuration which forms a hollow enclosure when closed, and preferably is formed of a molded plastic material such as polypropylene. Container 1 includes a rectangular-shaped flat bottom wall 5 and a rectangular-shaped lid 6. Lid 6 includes a top closure wall 7 similar in size and shape to bottom wall 5, and upstanding parallel end walls 8 and 9 and a front wall 10. Walls 8, 9 and 10 are formed integrally with top wall 7 and are arranged in a U-shaped configuration to enclose three sides of bottom wall 5 when in the closed position. Lid 6 is movably mounted on bottom wall 5 by a double-hinged panel 11 for pivotal movement between open and closed positions.

Video cassette 2 (FIG. 1) is of the type having a pair of spaced tape reel hubs, indicated generally at 15, mounted within the cassette, which hubs have a magnetic tape 16 wound thereon. Each tape reel hub 15 (FIG. 2) includes a bottom wall 17 and a cylindrical side wall 18 which defines a recess 19 in the hub. A pair of spaced access openings 20 are formed in a bottom wall 21 of cassette 2, each of which is generally aligned with a respective one of the hub recesses 19.

Figure 2:
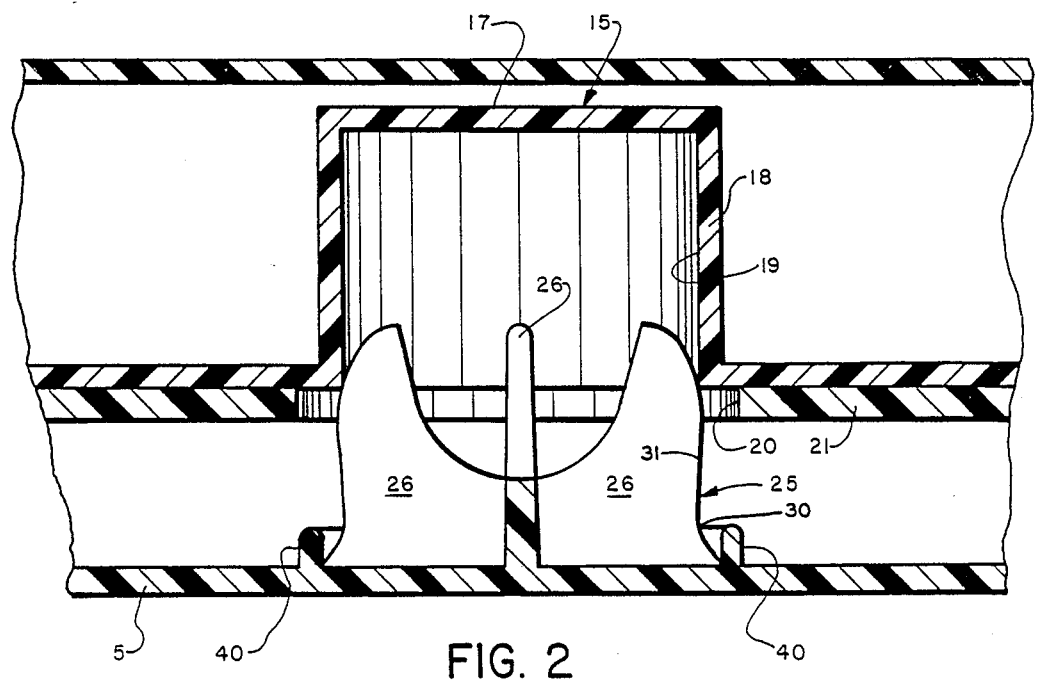
FIG. 2 is an enlarged fragmentary sectional view showing the improved self-locking finger assembly beginning to be engaged by one of the tape reel hubs of the video cassette.

In accordance with a main feature of the invention, a pair of self-locking finger assemblies, each indicated generally at 25, is located in a spaced relationship on bottom wall 5 of container 1, as shown in FIG. 1. Finger assemblies 25 project outwardly from the inside surface of bottom wall 5 and are located to project through cassette access openings 20 and into hub recesses 19 when cassette 2 is placed in container 1 (FIGS. 2 and 3). Since the construction and operation of each finger assembly 25 is similar, only one of the assemblies is described in detail.

Finger assembly 25 is formed integrally with container wall 5 and thus of the same polypropylene material, and includes four fingers 26 spaced 90° apart, so that each finger 26 is positioned in diametrically opposed relationship to one of the other fingers as shown in FIGS. 4 and 6. Each finger 26 is formed integrally with the other fingers, and forms a generally U-shaped member with its diametrically opposed paired finger. Each finger 26 is a generally flat member formed with a concave inner edge 27 and a generally convex outer edge 28. More specifically, convex outer edge 28 includes upper, lower and intermediate portions 29, 30 and 31, respectively, with upper portion 29 being arcuate-shaped, lower portion 30 forming an undercut on convex outer edge 28 adjacent to bottom wall 5 of storage container 1, and intermediate portion 31 being generally elongated and straight. Concave inner edge 27 comprises a generally straight upper portion 32 and an arcuate lower portion 33.

An upstanding annular member 40 (FIGS. 1, 2, 4, 6 and 8) is formed integrally with bottom wall 5 of container 1, and encircles each finger assembly 25. Annular member 40 is of the type presently used on many known cassette storage containers for generally positioning a cassette within the container and limiting lateral movement of the cassette therein. Each annular member 40 is located to project into a respective access opening 20 of cassette 2 and will engage bottom wall 21 when the cassette is placed in the storage container.

Figure 7:
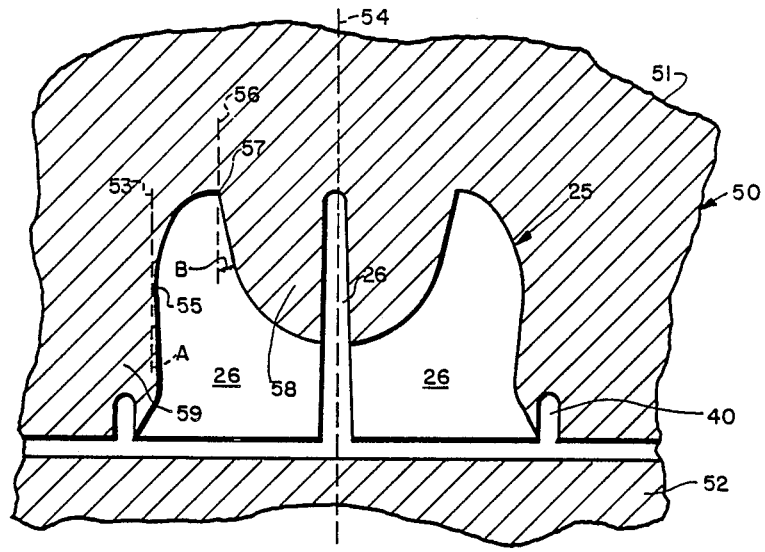
FIG. 7 is a diagrammatic sectional view showing the molding of the improved self-locking finger assembly.
Figure 8:
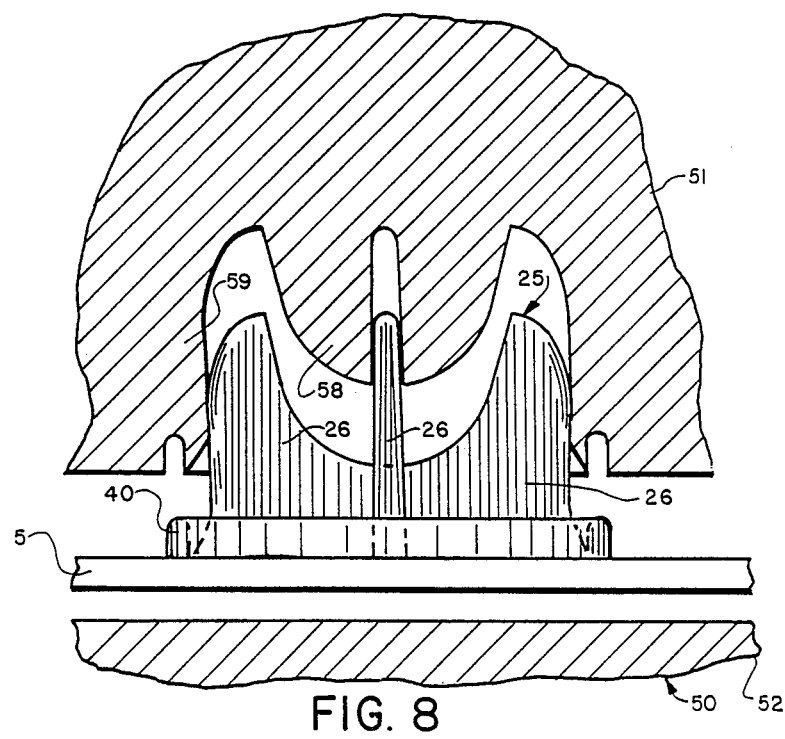
FIG. 8 is a diagrammatic sectional view similar to FIG. 7, showing the partial removal of the mold from the molded self-locking finger assembly of the present invention.

In accordance with an important feature of the invention, the combination of undercut lower portion 30 of convex outer edge 28, and concave inner edge 27 of each finger 26, enables the finger pairs to flex inwardly toward each other as well as to be molded integrally with bottom wall 5 of storage container 1. More particularly, this design feature of fingers 26 enables cassette storage container 1 to be molded in a simple "open and shut type mold" having no moving parts or cams for ejecting the container from the mold, and requiring no subsequent manufacturing assembly of the finger assemblies and/or storage container. A mold, indicated generally at 50, is shown diametrically in FIG. 7 in a completely closed position and with the preferred polypropylene molding material introduced therein. FIG. 8 shows the mold being partially opened just after completion of molding of the cassette storage container including finger assembly 25. It can be seen that when a top section 51 and bottom section 52 of mold 50 start to separate and move toward the open position, finger assembly 25 will easily disengage from top section 51 of the mold due to the particular configuration of fingers 26.

More specifically, an imaginary tangent line 53 (FIG. 7) extends parallel to a longitudinal axis 54 of opposed fingers 26 and is tangential to an outermost point 55 of arcuate upper portion 29 of outer edge 28 of each finger 26. An angle "A" is formed between line 53 and elongated straight intermediate portion 31 of outer edge 28. Another imaginary line 56 extending parallel to longitudinal axis 54 and passing through an uppermost point 57 of finger 26 forms an angle "B", with straight upper portion 32 of inner edge 27 of finger 26. Since angle "B" is greater than angle "A", or in other words, since the pitch or slope of straight upper portion 32 of inner edge 27 is greater than the pitch of straight intermediate portion 31 of outer edge 28, a mold portion 58 clears straight upper portion 32 relatively quick when top mold portion 51 is separated from bottom mold portion 52 as shown in FIG. 8. Thus, when a mold portion 59 engages the just molded arcuate upper portion 29 of outer edge 28 of finger 26, it flexes finger 26 inwardly, and mold portion 58 does not interfere with this forced inward finger movement due to the above discussed angular relationship of the inner and outer finger edges.

In its intended use, a cassette 2 is placed into improved storage container 1 as shown in FIG. 1, whereby each access opening 20 of the cassette is manually aligned with a respective one of the finger assemblies 25 of the container. Upon initial placement of the cassette in the storage container as illustrated in FIG. 2, the cassette is moved toward bottom wall 5 and fingers 26 of each finger assembly 25 pass through access opening 20 and into hub recess 19. Arcuate upper portion 29 of outer edge 28 of fingers 26 serve as camming surfaces which are engaged by the cylindrical sidewall of the tape reel hub 15 for moving the fingers toward their inward flexed position. The combination of undercut lower portion 30 of outer edge 28 of each finger 26, together with concave inner edge 27, enables the fingers to flex in this manner. Continued manual downward pressure on the cassette toward bottom wall 5 forces the fingers to their inward flexed position as shown in FIG. 3. When the cassette is fully inserted in container 1, that is, when bottom wall 21 of the cassette contacts bottom wall 5 of the container, the fingers are biased outwardly due to the natural flexibility of the plastic material, toward their normal at-rest position and engage the hub sidewalls to prevent rotation of the tape reel hubs within the cassette.

More particularly, and in accordance with one of the main features of the invention, when finger assemblies 25 are in their fully seated position within hub recesses 19, elongated straight portion 31 of outer edge 28 of each finger forms an axially extending line contact with hub sidewall 18 as shown in FIG. 3. This frictional engagement of elongated straight portions 31 of fingers 26 with hub sidewall 18 frictionally secures the hubs with the fingers and prevents the hubs from rotating or otherwise rattling within cassette 2. In addition, the spacing of fingers 26 of each finger assembly 25 90° apart provides for secure engagement of each tape reel hub 15 by two diametrically opposed pairs of fingers or four line contacts. However, two, three or more than four fingers could be included in each finger assembly 25 if desired, without effecting the concept of the invention. Also, arcuate upper portion 29 of outer edge 28 of finger 26 is rounded and free of sharp edges, as best shown in FIG. 4, to prevent damage from sharp edges to bottom wall 17 of the hub should the fingers contact the bottom wall in a particular application. Moreover, the line contact of fingers 26 with hub sidewall 18 prevents marring of the sidewall which could adversely effect the operation of cassette 2 in a video cassette playback machine and/or recorder. Thus, such a line contact is an improvement over many of the point contact hub retention devices found in the prior art.

Each annular member 40 engages or extends into one of the access openings 20 formed in bottom wall 21 of the cassette and engages the circular edge of the bottom wall which defines access opening 20, as shown particularly in FIG. 3, to position and prevent lateral movement of the cassette within the container when fully inserted therein.

The preferred dimensions of finger assembly 25 are set forth below. The thickness of each finger 26 represented by distance 41 (FIG. 5), is generally within the range of between 0.06 and 0.10 inches. The linear distance between the innermost point of undercuts 30 of each opposed pair of fingers represented by dash line 42, is generally equal to the inside diameter of hub recess 19, as shown in FIG. 3. The preferred range for the linear distance between outermost point 55 of arcuate upper portions 29 of each opposed pair of fingers represented by dash line 43 (FIG. 5), generally is between 1.240–1.265 inches. It is to be understood that certain dimensions and design features of the invention could be varied without effecting the concept of the invention. For example, the depth of undercut 30 could be increased to increase the flexibility of the fingers.

Although the finger assemblies which are formed integrally with improved cassette storage container 1 are intended primarily for use with the commercial three-quarter inch tape format, such features and operation can be incorporated into a storage container used for the one-half inch tape format. Also, the finger assemblies can be incorporated into containers for use in applications other than video tapes, such as audio tapes, movie film reels or other apparatus in which the prevention of rotation of a member having a hub recess is desired. Thus, the invention need not be limited to video tapes.

Again, an important feature of the present invention is the manner in which elongated straight portions of diametrically opposed pairs of flexible fingers securely frictionally engage the cylindrical sidewalls of the tape reel hubs of a video cassette in an axially extending line engagement to prevent rotation thereof during shipment and storage. Another important feature of the finger assemblies of the invention is the combination of an undercut on the convex outer edge of each finger of the assembly and the concave inner edge of the fingers, which enables inward flexing of the fingers. Also, the comparative angles of the elongated straight portions of the inner and outer edges of each finger with respect to the longitudinal axis of the opposed pairs of fingers is important since this enables the storage containers and finger assemblies to be molded concurrently and in a single procedure as integral one-piece members in relatively inexpensive molds which have no moving parts, cams, etc., and also eliminates additional manufacturing assembly of the finger assemblies and/or storage containers. It is this angular relationship which enables that portion of the mold which forms the inner concave portion between the fingers to move away from the concave edges of the fingers before that portion of the mold which forms the outer convex edges of the fingers slideably engages the upper areas of the fingers and moves the fingers inwardly into the just vacated space of the mold to enable molds without moving parts to be utilized.

In summary, the improved cassette storage container is inexpensive to manufacture, rugged, easy to use, and effectively prevents rotation of the tape reel hubs of a cassette so that the magnetic tape contained therein remains wound on the hubs and undamaged during shipping and storage. The improved container also prevents rattling and other undesirable movement of the hubs, as well as lateral movement of the cassette within the container. The container additionally provides a dust-free environment for storage of the cassette and prevents physical damage to the cassette during shipment. Finally, the finger assemblies of the container prevent a cassette from tumbling out of the container upon opening thereof, even if opened incorrectly.

Accordingly, the improved cassette storage container is simplified, provides an effective, safe, inexpensive, and efficient device which achieves all of the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved cassette storage container is constructed and used, the characteristics of the construction, and the advantageous, new and useful results obtained; the new and useful structures, devices, elements, arrangements, parts, and combinations, are set forth in the appended claims.

I claim:

1. A container for storing a tape cassette of the type having at least one tape reel hub comprising a cylindrical sidewall defining a recess in the hub, said hub recess being accessible through an opening formed in a bottom wall of the cassette, said storage container including enclosure means for receiving and enclosing a tape cassette in the storage container; and hub engaging means formed on the storage container and located for entering the hub recess through the access opening when a cassette is placed in said container for preventing rotation of the tape reel hub, said hub engaging means including at least a pair of flexible, generally opposed fingers movable between normal biased and flexed positions, said fingers being formed on the storage container in a diametrically opposed relationship with each of the fingers being a generally flat member formed with a concave inner edge and a generally convex outer edge, said convex outer edge having an undercut lower portion, an arcuate upper portion which serves as a camming surface for moving the finger to the flexed position upon initial placement of a cassette into the storage container and into engagement with the cylindrical sidewall of the tape reel hub, and a generally elongated straight intermediate portion which engages the sidewall of the hub in an axially extending direction to provide frictional line contact therebetween to prevent rotation of the hub when the cassette is fully inserted into the storage container and the fingers urge toward the normal biased position.

2. The device defined in claim 1 in which the enclosure means is a hollow container comprising spaced side, end, top, and bottom walls.

3. The device defined in claim 1 in which the concave inner edge comprises a generally straight upper portion and an arcuate lower portion; in which the linear distance between an innermost point of the undercut lower portions of the pair of opposed fingers generally is equal to an inside diameter of the tape reel hub; and in which a first angle formed between an imaginary tangent line which extends parallel to a longitudinal axis of the opposed fingers and is tangential to an outermost point of the arcuate upper portion of the outer edge, and the elongated straight intermediate portion of the outer edge, is less than or equal to a second angle formed between a second imaginary line which extends parallel to the longitudinal axis of the opposed fingers and passes through an uppermost point of the finger, and the straight upper portion of the inner edge.

4. The device defined in claim 1 in which the fingers are formed of polypropylene; in which the pair of opposed fingers are formed integrally with each other and with the storage container; and in which the integrally formed pair of fingers forms a generally U-shaped member.

5. The device defined in claim 1 in which positioning means is formed on the storage container and projects into the access opening when a cassette is placed into the storage container for positioning the cassette in the storage container.

6. The device defined in claim 5 in which the positioning means is an annular member formed integrally with the storage container and encircles the pair of opposed fingers.

7. The device defined in claim 1 in which the thickness of each of the fingers is generally within the range of between 0.06 inches and 0.10 inches.

8. The device defined in claim 1 in which the arcuate upper portion of the outer edge of each of the pair of fingers is rounded and free of sharp edges.

9. The device defined in claim 3 in which a linear distance between the outermost point of the arcuate upper portions of the pair of opposed fingers if generally within the range of between 1.240 inches and 1.265 inches.

10. A container for storing a tape cassette of the type having at least one tape reel hub comprising a cylindrical sidewall defining a recess in the hub, said hub recess being accessible through an opening formed in a bottom wall of the cassette, said storage container including enclosure means for receiving and enclosing a tape cassette in the storage container; and hub engaging means formed on the storage container and located for entering the hub recess through the access opening when a cassette is placed in said container for preventing rotation of the tape reel hub, said hub engaging means including at least a pair of flexible, diametrically opposed fingers each having an outer edge formed with a generally elongated straight portion, and being movable between normal biased and flexed positions, said fingers being engaged by the sidewall of the hub and moved to the flexed position upon placing a cassette into the storage container, so that said fingers urge toward the normal biased position and the elongated straight portion of the outer edge of each of the fingers engages the cylindrical sidewall to provide a pair of diametrically opposed frictional line contacts therebetween to prevent rotation of the tape reel hub within the cassette; each of said fingers being a generally flat member formed with a concave inner edge and a generally convex outer edge, said convex outer edge having an undercut lower portion, an arcuate upper portion which serves as a camming surface for moving the finger to the flexed position upon initial placement of a cassette into the storage container and engagement of the cylindrical sidewall of the tape reel hub with said arcuate upper portion, and an elongated straight portion located intermediate the undercut lower and arcuate upper portions which engages the sidewall of the hub in an axially extending direction to provide frictional line contact therebetween and prevent rotation of the hub when the cassette is fully inserted into the storage container and the fingers urge toward the normal biased position.

11. The device defined in claim 10 in which the concave inner edge comprises a generally straight upper portion and an arcuate lower portion; in which the linear distance between an innermost point of the undercut lower portions of the pair of opposed fingers generally is equal to an inside diameter of the tape reel hub; and in which a first angle formed between an imaginary tangent line which extends parallel to a longitudinal axis of the opposed fingers and is tangential to an outermost point of the arcuate upper portion of the outer edge, and the elongated straight intermediate portion of the outer edge, is less than or equal to a second angle formed between a second imaginary line which extends parallel to the longitudinal axis of the opposed fingers and passes through an uppermost point of the finger, and the straight upper portion of the inner edge.

12. A container for storing a tape cassette of the type having at least one tape reel hub comprising a cylindrical sidewall defining a recess in the hub, said hub recess being accessible through an opening formed in a bottom wall of the cassette, said storage container including enclosure means for receiving and enclosing a tape cassette in the storage container; and hub engaging means formed on the storage container and located for entering the hub recess through the access opening when a cassette is placed in said container for preventing rotation of the tape reel hub, said hub engaging means including at least a pair of flexible, diametrically opposed fingers formed integrally with a wall of the storage container, said fingers being connected by a continuous concave inner surface and each having an undercut formed in an outer edge adjacent to the wall of the storage container for moving the fingers between normal biased and flexed positions, said fingers being engaged by the sidewall of the hub and moved to the flexed position upon placing a cassette into the storage container, so that said fingers urge toward the normal biased position and into diametrically opposed, axially extending engagement with the cylindrical sidewall to prevent rotation of the tape reel hub within the cassette.

13. The device defined in claim 12 in which each of the fingers is a generally flat member formed with a concave inner edge and a generally convex outer edge; and in which the generally convex outer edge comprises an undercut lower portion, an arcuate upper portion which serves as a camming surface for moving the finger to the flexed position upon initial placement of a cassette into the storage container and engagement of the cylindrical sidewall of the tape reel hub with said arcuate upper portion, and an elongated straight intermediate portion which engages the sidewall of the hub to prevent rotation of the hub when the cassette is fully inserted into the storage container and the fingers urge toward the normal biased position and to provide a frictional line contact therebetween.

14. The device defined in claim 13 in which the concave inner edge comprises a generally straight upper portion and an arcuate lower portion; in which the linear distance between an innermost point of the undercut lower portions of the pair of opposed fingers generally is equal to an inside diameter of the tape reel hub; and in which a first angle formed between an imaginary tangent line which extends parallel to a longitudinal axis of the opposed fingers and is tangential to an outermost point of the arcuate upper portion of the outer edge, and the elongated straight intermediate portion of the outer edge, is less than a second angle formed between a second imaginary line which extends parallel to the longitudinal axis of the opposed fingers and passes through an uppermost point of the finger, and the straight upper portion of the inner edge.

* * * * *